(12) United States Patent
Tao et al.

(10) Patent No.: US 8,692,200 B2
(45) Date of Patent: Apr. 8, 2014

(54) OPTICAL PROXIMITY SENSOR WITH IMPROVED DYNAMIC RANGE AND SENSITIVITY

(75) Inventors: Qian Tao, Singapore (SG); Gek Yong Ng, Singapore (SG); Richard Lum, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 430 days.

(21) Appl. No.: 12/652,912

(22) Filed: Jan. 6, 2010

(65) Prior Publication Data

US 2011/0163233 A1 Jul. 7, 2011

(51) Int. Cl.
*G01J 5/20* (2006.01)

(52) U.S. Cl.
USPC ...................................................... 250/338.4

(58) Field of Classification Search
USPC .................. 250/238, 338.4, 341.8; 356/3, 89
See application file for complete search history.

(56) References Cited

U.S. PATENT DOCUMENTS

| | | | |
|---|---|---|---|
| 4,574,250 A | | 3/1986 | Senderowicz |
| 4,697,152 A | * | 9/1987 | Westwick ............................ 330/9 |
| 4,723,554 A | * | 2/1988 | Oman et al. ..................... 600/306 |
| 4,835,561 A | * | 5/1989 | Matsui ............................... 396/93 |
| 5,068,540 A | * | 11/1991 | Tsuji .......................... 250/559.38 |
| 5,408,235 A | * | 4/1995 | Doyle et al. .................... 341/143 |
| 5,793,230 A | | 8/1998 | Chu et al. |
| 6,100,759 A | | 8/2000 | Sirna et al. |
| 7,132,883 B2 | * | 11/2006 | Huijsing et al. ................... 330/9 |
| 7,619,473 B2 | * | 11/2009 | Tanimoto et al. ............. 330/253 |
| 7,843,232 B2 | * | 11/2010 | Farhat et al. ...................... 327/91 |
| 8,097,853 B2 | * | 1/2012 | Ji et al. ............................ 250/340 |
| 2007/0163815 A1 | | 7/2007 | Ungaretti et al. |
| 2010/0230599 A1 | * | 9/2010 | Yamaguchi et al. .......... 250/351 |
| 2011/0215153 A1 | * | 9/2011 | He et al. ......................... 235/470 |

OTHER PUBLICATIONS

"A Low-Noise Chopper-Stabilized Fifferential Switched-Capacitor Filtering Technique," Hsieh et al., IEEE Journal of Solid-State Circuits, vol. SC-16, No. 6, Dec. 1981.
"TSL277t Light-to-Digital Convertor with Proximity Sensing," Texas Advanced Optoelectronic Solutions Data Sheet for TAOS100, Oct. 2009.
Data Sheet for TYTEK AlGaAs/GaAs Infrared chip—TK114IRA, Mar. 2004.
Data Sheet for TYTEK Si Photo-diode Chip—TK 043PD, Jun. 2004.

* cited by examiner

*Primary Examiner* — David Porta
*Assistant Examiner* — Edwin Gunberg (57) ABSTRACT

Various embodiments of an optical proximity sensor and corresponding circuits and methods for measuring small AC signal currents arising from the detection of pulsed AC light signals emitted by a light emitter and reflected from an object to detected in the presence of larger ambient light DC current signals are disclosed. Circuits and corresponding methods are described that improve the dynamic range, sensitivity and detection range of an optical proximity sensor by cancelling the contributions of DC current signals arising from ambient light signals that otherwise would dominate the detected small AC signal currents. The DC signal cancellation occurs in a differential amplifier circuit before small AC signal currents are provided to an analog-to-digital converter. The circuits and methods may be implemented using conventional CMOS design and manufacturing techniques and processes.

20 Claims, 6 Drawing Sheets

OPTICAL PROXIMITY SENSOR WITH IMPROVED DYNAMIC RANGE AND SENSITIVITY

FIELD OF THE INVENTION

Various embodiments of the inventions described herein relate to the field of proximity sensors, and components, devices, systems and methods associated therewith.

BACKGROUND

Optical proximity sensors, such as the AVAGO TECHNOLOGIES™ HSDL-9100 surface-mount proximity sensor, the AVAGO TECHNOLOGIES™ APDS-9101 integrated reflective sensor, the AVAGO TECHNOLOGIES™ APDS-9120 integrated optical proximity sensor, and the AVAGO TECHNOLOGIES™ APDS-9800 integrated ambient light and proximity sensor, are known in the art. Such sensors typically comprise an integrated high efficiency infrared emitter or light source and a corresponding photodiode or light detector, and are employed in a to large number of hand-held electronic devices such as mobile phones, Personal Data Assistants ("PDAs"), laptop and portable computers, portable and handheld devices, amusement and vending machines, industrial or sanitary automation machinery and equipment, contactless switches, and the like.

Figure 1:
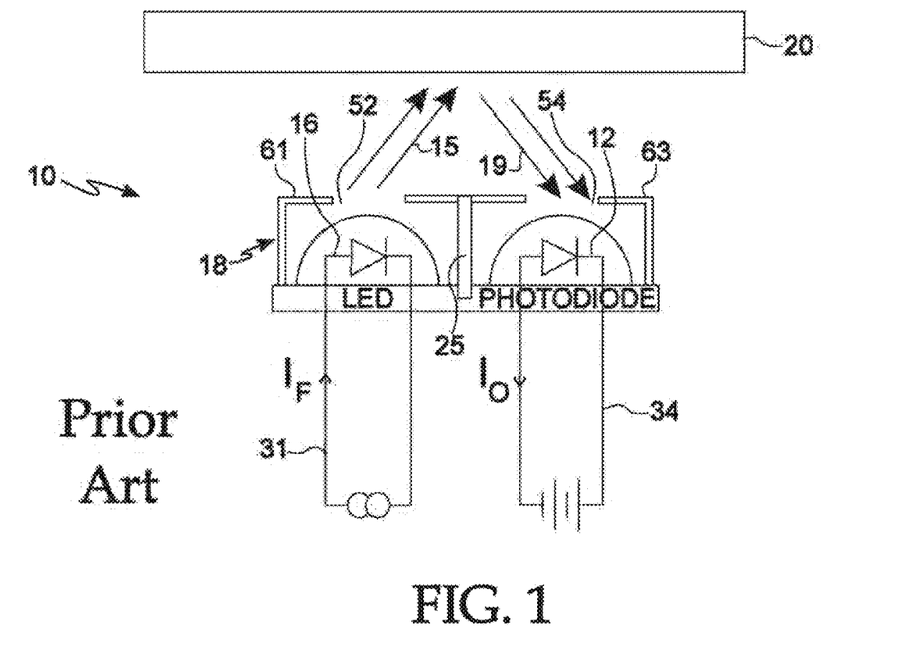
FIG. 1 shows a prior art optical proximity sensor and associated circuitry.

Referring to FIG. 1, there is shown a prior art optical proximity sensor 10 comprising infrared light emitter 16, light emitter driving circuit 31, light detector or photodiode 12, light detector sensing circuit 34, metal housing or shield 18 with apertures 52 and 54, and object to be sensed 20. Light rays 15 emitted by emitter 16 and reflected as light rays 19 from object 20 (which is in relatively close proximity to optical proximity sensor 10 and within the detection range thereof) are detected by photodiode 12 and thereby provide an indication that object 20 is close or near to sensor 10.

Light rays 15 typically cause light detector 12 to generate small AC current signals that are dwarfed by the ambient light DC current signals generated by ambient light falling on light detector 12 at the same time as rays 15 are being sensed. In some prior art devices, these small AC current signals are separated from the large ambient light DC current signals in a two-step procedure. In a first measurement cycle, LED 16 is turned off, and the DC current signal arising from ambient light falling on light detector 12 is integrated and stored in memory as a first measurement. In a second measurement cycle, LED 16 is turned on, and the AC current signal together with the DC current signal is integrated and stored in memory as a second measurement. To yield only the integrated AC current signal, the first measurement needs to be subtracted from the second measurement.

Such an approach can result in considerable complexity being required to implement the measurement method according to which the two measurement cycles are conducted. In addition, a subtraction operation is required. These requirements decrease the speed of signal acquisition and lower the power efficiency of sensor 10. Moreover, because the DC current signals presented to a subsequent stage analog-to-digital converter (ADC) stage from an amplifier stage can be 20,000 times greater in amplitude than those of the AC current signals, which reduces the dynamic range over which the desired AC current signals can be measured by the ADC stage. In such a situation, only the last few conversion bits or least-significant-bits (LSBs) are dedicated to detecting the narrow range of amplitudes over which the AC current signal is to be found, while most of the base conversion bits or most-significant-bits (MSBs) are dominated by the relatively fixed DC current signals.

This results in poor utilization of the full scale input dynamic range available in the ADC, as only a limited portion of the dynamic range is dedicated to quantifying the AC current signals. The subtraction operation also requires attempting to resolve the differences of two nearly equal large numbers corresponding to the DC current signals while attempting to obtain small numbers representative of the AC current signals. Such steps require the use of a very high resolution ADC, which in turn results in increased complexity and higher implementation costs.

What is needed is a differential integrator circuit that may be employed in applications such as optical proximity sensors that has increased dynamic range and sensitivity, and reduced complexity.

SUMMARY

In some embodiments, there is provided an optical proximity sensor comprising an infrared light emitter configured to emit AC pulses of infrared light, the infrared light emitter further being configured to emit no or low levels of infrared light in-between AC pulses, a light detector configured to detect ambient light DC signals and infrared light AC pulses emitted by the light emitter and reflected from an object to be detected towards the light detector, and a differential integrator circuit operably connected to the light detector and configured to receive output signals therefrom representative of the ambient light DC signals and the reflected infrared light AC pulses, where the differential integrator circuit comprises a differential amplifier configured to receive first input signals from the light detector representative of the ambient light DC signals during first periods of time occurring in-between the pulses and at a second input thereof second input signals representative of a combination of the ambient light DC signals and the reflected infrared light AC pulses during second periods of time occurring during the pulses, the differential amplifier and differential integrator circuit being configured to provide first and second analog output signals representative of positive and negative integrated reflected infrared light AC pulses, respectively, the first and second analog output signals having the ambient light DC signals cancelled therefrom.

In other embodiments, there is provided a method of operating an optical proximity sensor comprising emitting AC pulses of infrared light from an infrared light emitter, the infrared light emitter being configured to emit no or low levels of infrared light in-between AC pulses, detecting, with a light detector, ambient light DC signals and infrared light AC pulses emitted by the light emitter and reflected from an object to be detected towards the light detector, receiving with a differential integrator circuit operably connected to the light detector output signals from the light detector representative of the ambient light DC signals and the reflected infrared light AC pulses, receiving with a differential amplifier included in the differential integrator circuit first input signals from the light detector representative of the ambient light DC signals during first periods of time occurring in-between the pulses and at a second input thereof second input signals representative of a combination of the ambient light DC signals and the reflected infrared light AC pulses during second periods of time occurring during the pulses, and outputting from the differential amplifier and differential integrator circuit first and second analog output signals representative of positive and negative integrated reflected infrared light AC pulses, respectively, the first and second analog output signals having the ambient light DC signals cancelled therefrom.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale, Like numbers refer to like parts or steps throughout the drawings, unless otherwise noted.

DETAILED DESCRIPTIONS OF SOME EMBODIMENTS

According to one embodiment, a circuit 60 is provided that includes a fully-differential, low-noise, high-sensitivity integrator circuit 60 capable of detecting low-amplitude AC current signals originating from light emitter 16 in the presence of high-amplitude DC current signals arising from ambient light. One application in which circuit 60 may be employed is in optical proximity sensor 10, which translates light detected by light detector 12 (typically a photodiode or photosensor) into measurements corresponding to distances between object to be detected 20 and sensor 10.

In optical proximity sensors, accurate detection of weak light detector current signals arising from LED pulses being emitted and reflected from object to be detected 20 in the presence of strong ambient light conditions such as daylight or sunlight may be difficult. The photodiode current generated by ambient light falling on light detector 12 is considered to be a fixed DC component of the overall current developed by light detector 12. The photodiode current generated when light emitter or LED 16 is turned on is an AC current signal whose amplitude, frequency and phase depend, among other things, on the characteristics of the switching signal being employed to drive light emitter 16, as well as the intensity of the light emitted by light emitter 16 that has been reflected from object to be detected 20 and received by light detector 12.

The AC current signal corresponding to periods of time when light emitter 16 is turned on is only generated when light emitter or LED 16 is turned on and object to be detected 20 is in sufficiently close proximity to be detected by sensor 10. The amount of current generated by light detector or photodiode 12 is proportional to the active area of light detector 12. It is desirable that the active area of a silicon photodiode employed in light detector 12 be small so that semiconductor manufacturing costs can be lowered and sensor 10 can be made more compact. The unusual capability of sensor 10 illustrated and described herein to detect accurately low-amplitude AC current signals permits a small photodiode area to be utilized on the silicon semiconductor device employed to form light detector 12, meaning that low silicon implementation costs may be achieved.

Typically, DC photodiode currents generated by light detector 12 that arise from ambient light are on the order of about 2,000 nA or more, while the AC photodiode currents generated by light detector 12 arising from reflected light rays 19 when light emitter or LED 16 is turned on are on the order of about 0.1 nA to about 5 nA, depending on the detection range of sensor 10. Hence, the ratio of the ambient light induced signal, or DC current signal, to the LED induced, or AC current signal, can be in the range of about 400 to about 20,000 (or even higher).

This large ratio between DC current signal amplitudes and AC current signal amplitudes makes the detection of small AC current signals extremely difficult in the presence of a strong ambient light or DC current signals, and places huge demands on the noise and sensitivity levels of light detector 12 and the subsequent sensing and processing circuitry of sensor 10.

To overcome these difficulties, and according to one embodiment, a differential integrator circuit 60 is provided that is capable of eliminating the average DC current signals that have been integrated over at least one complete cycle of an LED clock period according to which light emitter or LED 16 is switched on and off, while the measured amplitudes of small AC current signals over multiple integration cycles increase until an AC current signal with sufficiently high signal-to-noise ratio has been obtained to permit an accurate determination of the distance object to be detected 20 is from sensor 10 at a given point in time. This in turn significantly relaxes the resolution requirements of the succeeding analog-to-digital converter (ADC) stage. A sigma-delta modulator may then be used to convert the integrated AC signals into digital codes representing the distance object to be detected is from sensor 10. Circuit 60 may be manufactured using standard digital CMOS design and manufacturing technologies.

Figure 2:
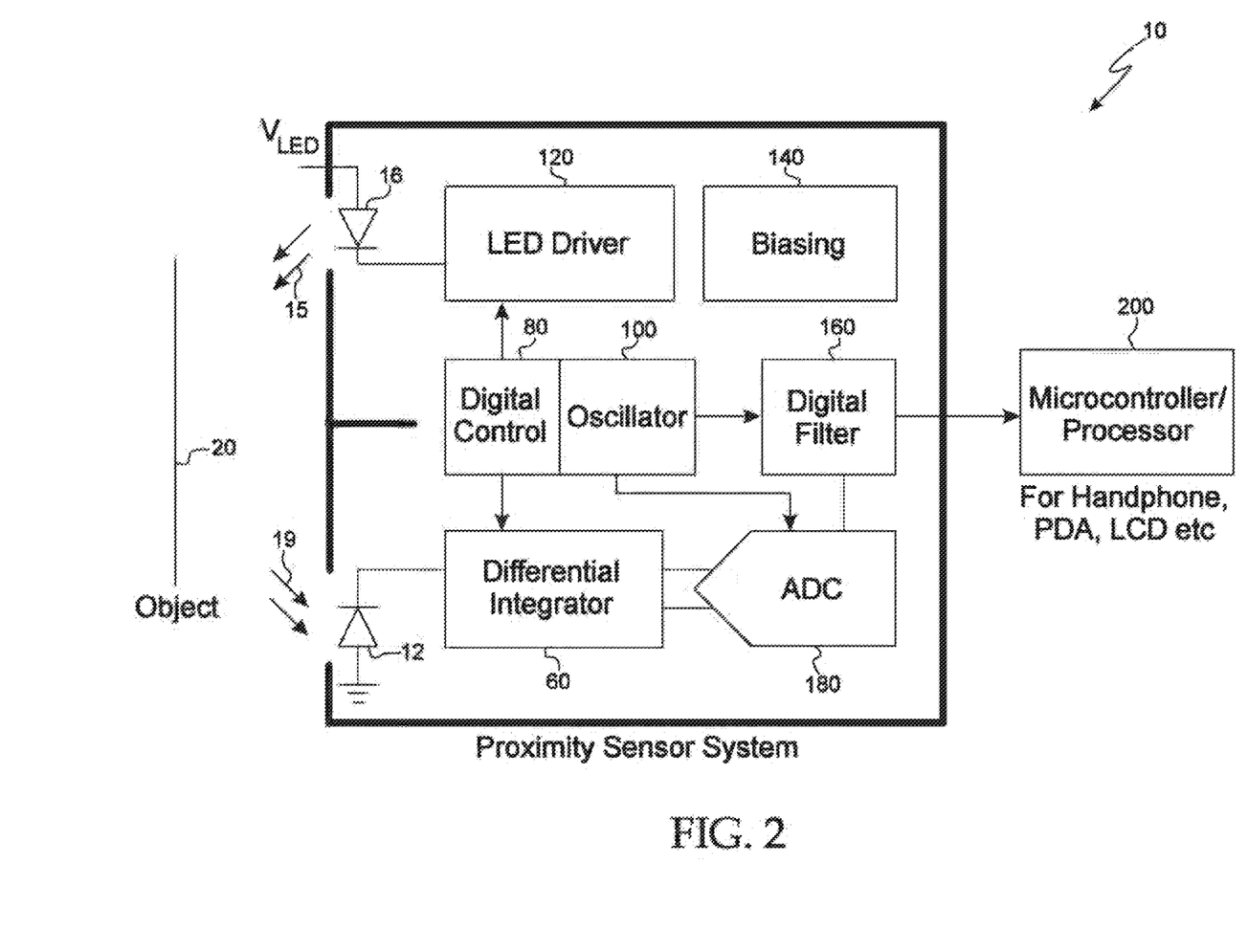
FIG. 2 shows a block diagram according to one embodiment of an optical proximity sensor.

Referring now to FIG. 2, there is shown a block diagram of various electrical and electronic components according to one embodiment of optical proximity sensor 10. As shown in FIG. 2, proximity sensor 10 comprises light emitter or light source 16 (which according to one embodiment is an light emitting light diode or LED having a wavelength around 940 nm, but which may be any suitable source of light), and light detector or photodetector 16, which may be a photosensor, photodiode or any other suitable light detector. In one embodiment, light emitter 16 may be a TK 114IRA AlGaAs/GasAs infrared chip manufactured by TYNTEK™, or any other suitable light emitting device.

In the embodiment shown in FIG. 2, optical proximity sensor 10 further comprises a fully differential high-sensitivity integrator circuit 60, sigma-delta analog-to-digital converter (ADC) 180, digital filter circuit 160, oscillator circuit 100, digital control circuit 80, biasing circuit 140 and LED driver circuit 120. Microcontroller 200 receives output signals generated by digital filter 160 of optical proximity sensor 10. In one embodiment, digital filter circuit 160 averages the outputs provided by ADC 180 in the digital domain, The complementary DC components of the output signals provided by differential integrator circuit 60 (see FIG. 7) cancel one another since their average is zero. AC current signals representing the distance object to be detected is from sensor 10 are not cancelled, however. In one embodiment, oscillator circuit 100 generates a global clock signal having a frequency of 1.6 MHz that is employed to provide timing signals to the other components and circuitry of sensor 10. Digital control circuit 80 provides control signals to circuit 60 and LED driver circuit 120 (which includes circuit 31 of FIG. 1). Biasing circuit 140 provides all the biasing currents and voltages that are required by the other electrical and electronic components of sensor 10.

Note that according to some embodiments circuit 60 may be any circuit or combination of circuits having suitable differential and amplifier signal integration analog and/or digital circuitry. Thus, differential amplifier 62 may be a fully-differential, low-noise, high-sensitivity amplifier of the type shown in FIGS. 3 and 4, or may be any other suitable differential amplifier. Likewise, ADC circuit 180 is not limited to a sigma-delta ADC, but instead may comprise any suitable ADC circuitry.

Furthermore, the circuitry shown in FIG. 2 is merely representative of the types of circuits that may be employed in sensor 10. For example, digital control circuit may be a processor, a microprocessor, a controller, a microcontroller, a state machine, or an ASIC having processing and control capabilities.

Continuing to refer to FIG. 2, in one embodiment infrared light emitter 16 is configured to emit AC pulses of infrared light. Infrared light emitter 16 is further configured to emit no or low levels of infrared light in-between the AC pulses In one embodiment, such no or low levels of infrared light correspond to those periods of time after light emitter 16 has been switched off so as not to emit light 15, but before light emitter 16 has been switched back on to emit light 15. As shown, output light rays 15 are directed towards object to be detected 20, from which rays 15 are reflected to form reflected light rays 19, which in turn become incident on light detector 12, and are ultimately used by sensor 10 to determine the distance object to be detected 20 is from optical proximity sensor 10. In one embodiment, light detector 12 may be a TK 043PD Si photodiode chip manufactured by TYNTEK™, or any other suitable light emitting device.

Still referring to FIG. 2, light detector 12 is configured to detect not only infrared light AC pulses emitted by the light emitter and reflected from object to be detected 20 towards light detector 12 as rays 19, but also ambient light DC signals. Such ambient light DC signals often possess amplitudes that are significantly higher than those of reflected infrared light pulses 19 (which are essentially superimposed atop the ambient light DC signals), and indeed may possess amplitudes that are much greater than those of the reflected infrared light pulses 19. As described above, light emitter 16 is switched on and off to emit an AC output light signal or pulse, more about which is said below. Light detector 12 generates output signals which are representative of the combined ambient light DC signals and reflected infrared light AC pulses 19. Differential integrator circuit 60 is operably connected to light detector 12 and is configured to receive such output signals from light detector 12.

Figure 3:
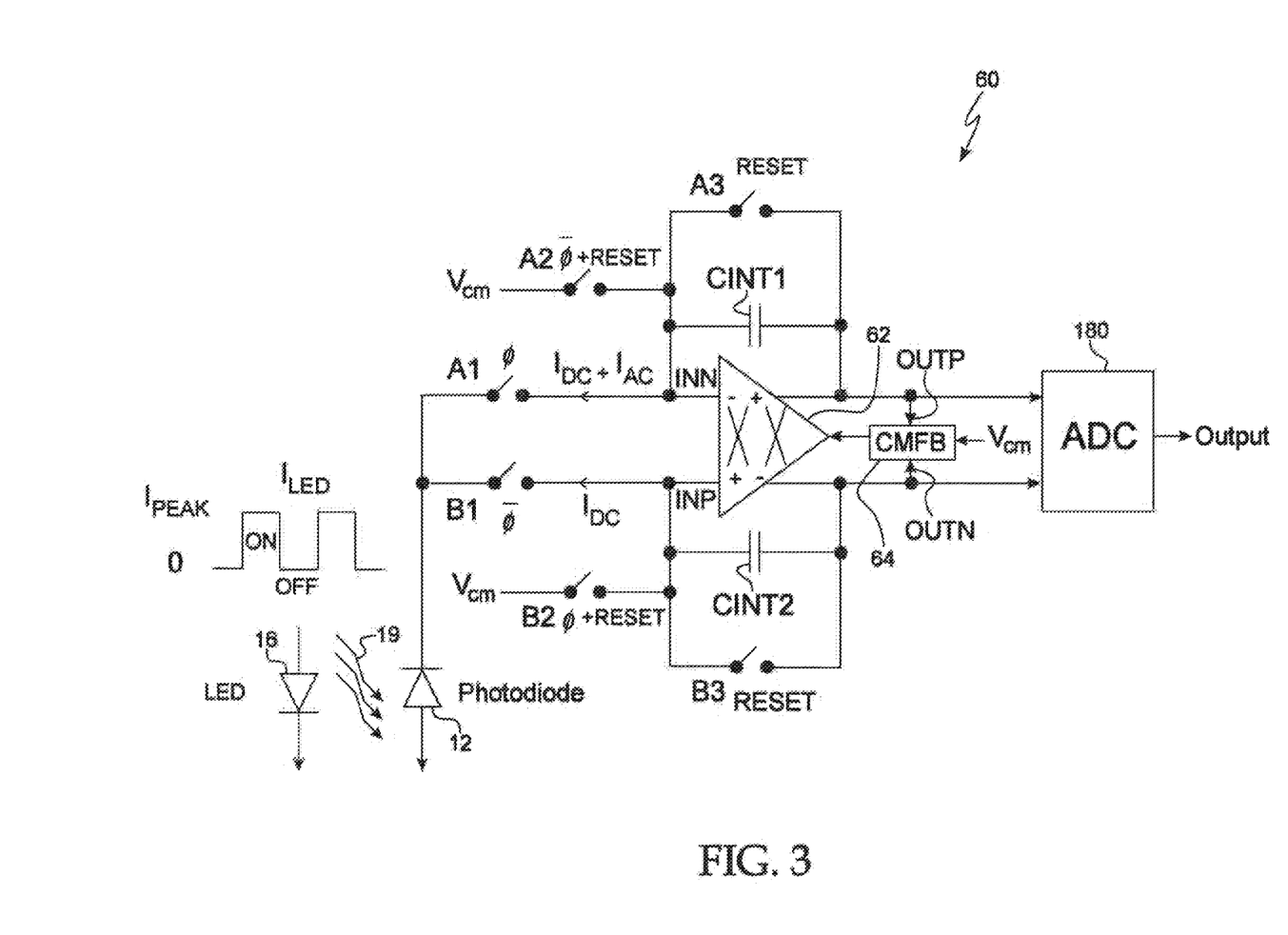
FIG. 3 shows one embodiment of a differential integrator circuit 60.

Referring now to FIGS. 2 and 3, in one embodiment differential integrator circuit 60 comprises differential amplifier 62 configured to receive at first input thereof (INP) first input signals from light detector 12 that are representative of the ambient light DC signals during first periods of time occurring in-between the AC pulses when light emitter 16 is turned off. First input signals are provided to first input INP when switch A1 is open and switch B1 is closed, which in turn corresponds to first periods of time when AC light pulses are not being emitted by light emitter 16 and only DC ambient light signals are being sensed.

Differential amplifier 62 is further configured to receive at a second input thereof (INN) second input signals representative of a combination of the ambient light DC signals and reflected infrared light AC pulses 19 during second periods of time occurring when light emitter 16 is turned on and is emitting AC pulses and when ambient light signals are also being sensed. Second input signals are provided to second input INN when switch A1 is closed and switch 61 is open, which in turn corresponds to second periods of time when pulses are being emitted by light emitter 16 because emitter 16 is on.

Figure 5:
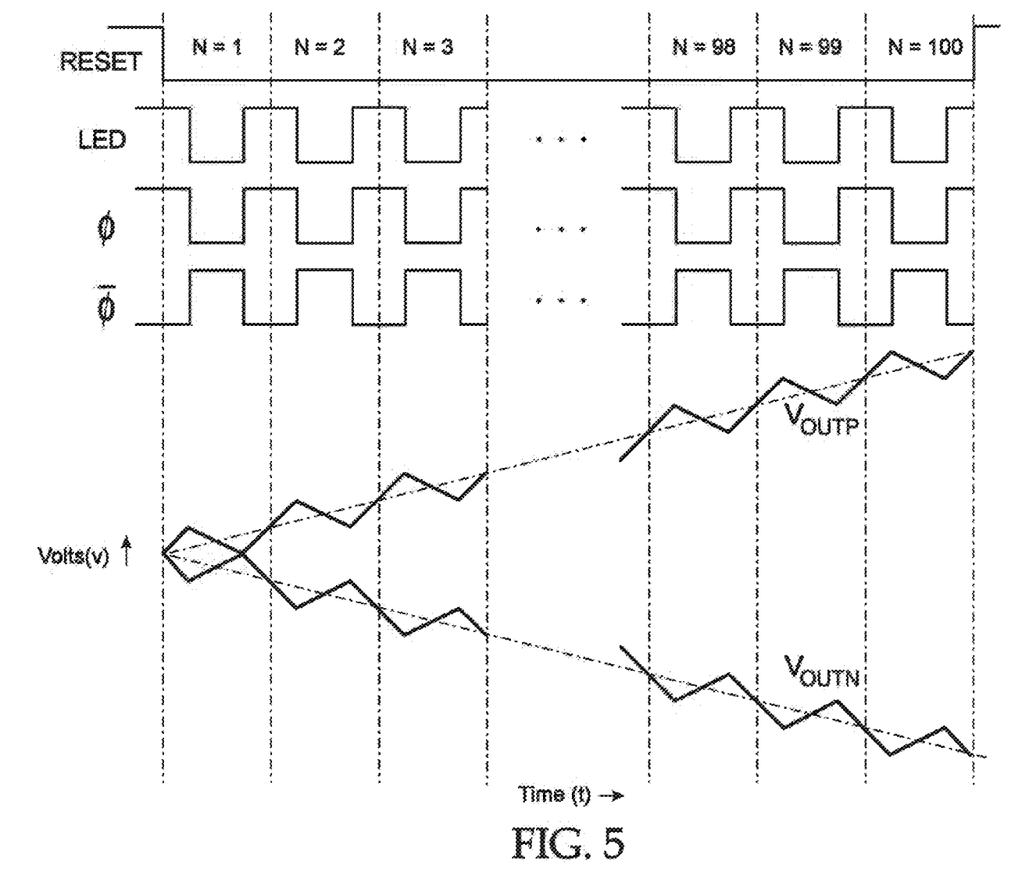
FIG. 5 shows timing diagrams corresponding to the block diagram of FIG. 2 and circuit 60 of FIG. 3.
Figure 6:
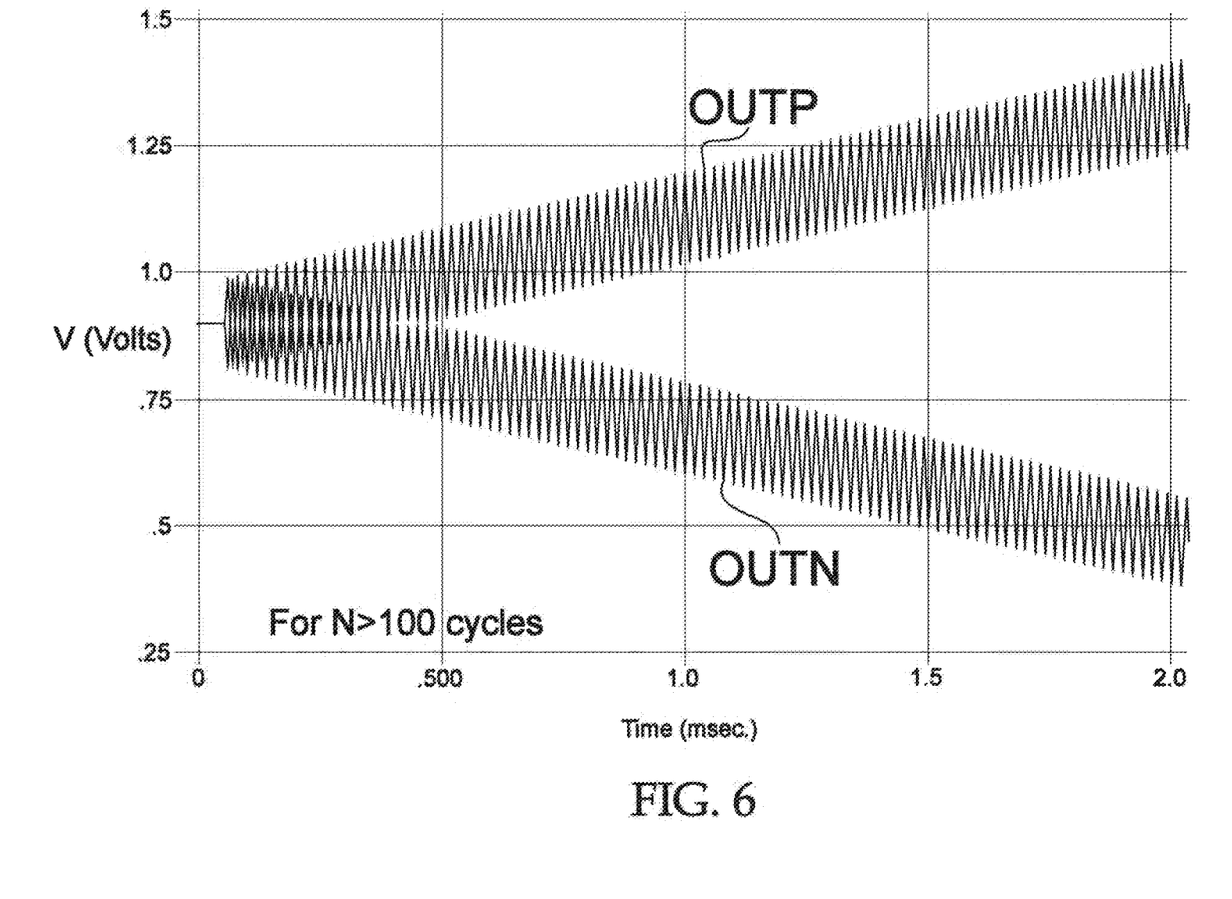
FIG. 6 shows output signals OUTP and OUTN provided by circuit 60 of FIG. 3.

Differential amplifier 62 and differential integrator circuit 60 are configured to provide first and second analog output signals OUTN and OUTP that are representative of positive and negative integrated reflected infrared light AC pulses respectively, where the first and second analog output signals have had the ambient light DC signals cancelled therefrom through the action of differential amplifier 62 (see FIGS. 5 and 6 for examples of OUTP and OUTN signals provided according to one embodiment of circuit 60).

Continuing to refer to FIGS. 2 and 3, in one embodiment differential amplifier 62 is a fully-differential, low-noise, high-sensitivity integrator. When light emitter or LED 16 is turned on and emits light detected by light detector 12, light emitter 16 receives current $I_{LED}$. Light emitter or LED 16 is driven by current pulse $I_{LED}$ at a predetermined fixed frequency. When $I_{LED}$ goes low at a zero current state, light emitter 16 is turned off. When $I_{LED}$ goes high in an $I_{PEAK}$ current state, light emitter 16 is turned on. While light emitter or LED 16 is turned off, light detector or photodiode 12 generates a DC current caused by ambient light ($I_{DC}$). While light emitter or LED 16 is turned on, in addition to $I_{DC}$, light detector or photodiode 12 generates an AC current corresponding to the AC light pulse signals emitted by light emitter 16 and received by light detector 12 as rays 19. The current generated by light detector or photodiode 12 in either state charges capacitors CINT1 and CINT2. The differential outputs of differential amplifier 62 are then provided to ADC 180, which as pointed out above may be a sigma-delta ADC. Note that currents $I_{DC}$ on the one hand, and $I_{DC}+I_{AC}$ on the other hand, shown in FIG. 3 are complementary signals that according to one embodiment are of opposite phase with respect to one another.

Figure 4:
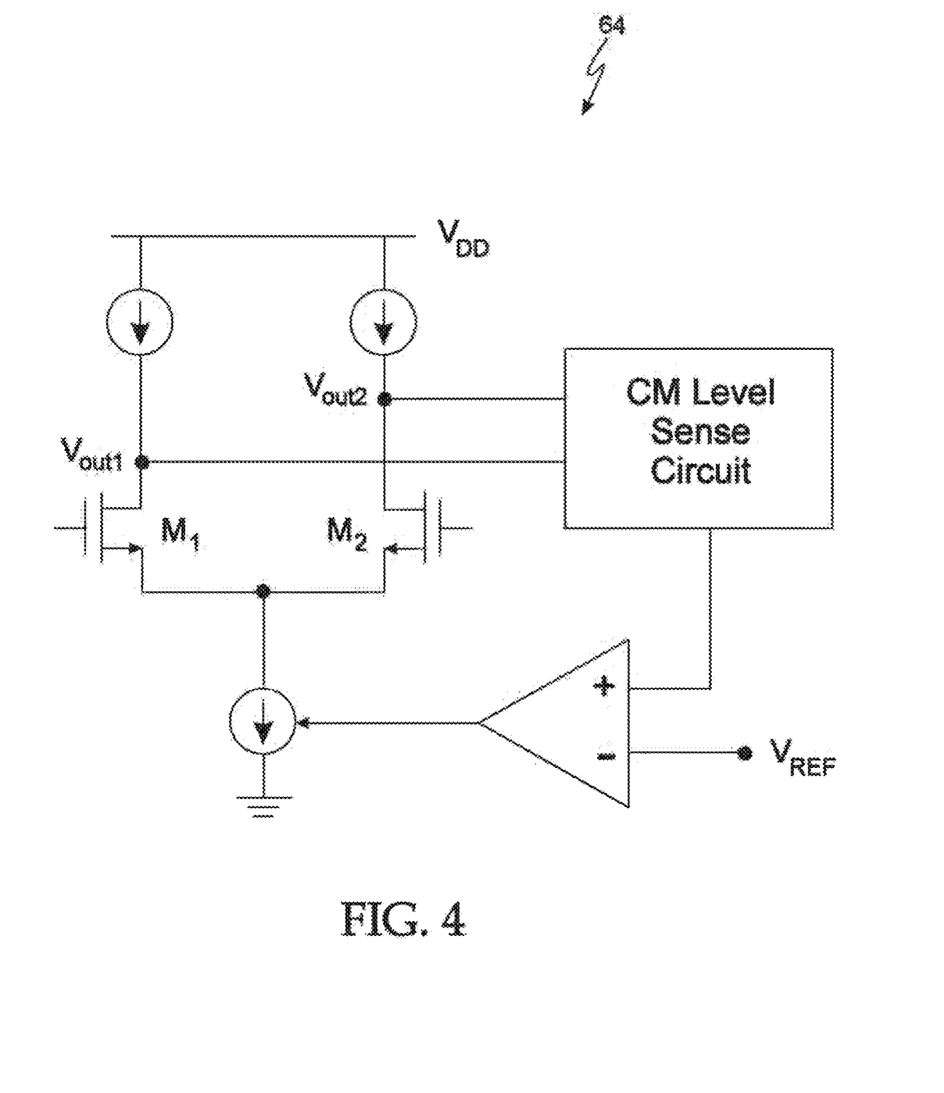
FIG. 4 shows one embodiment of a common mode feedback circuit 64.

Referring now to FIG. 4, there is shown one embodiment of common mode feedback (CMFB) circuit 64. See, for example, "Design of Analog CMOS Integrated Circuits" by Behzad Razavi, McGraw-Hill, 2001, pp. 317, for further technical details concerning such a circuit 64. Circuit 64 of FIG. 4 averages sensed outputs $V_{out1}$ and $V_{out2}$ and compares them to a reference level $V_{ref}$ provided through an amplifier. The output of the amplifier is then fed-back to adjust the current source, which in turn adjusts the common-mode level of the two outputs.

FIG. 5 shows timing waveforms illustrate the operation of circuit 60 in FIG. 3 according to one embodiment. Referring now to both FIGS. 3 and 5, at the start of the operation of circuit 60, RESET is high so that switches A2, A3, B2 and B3 are closed. Inputs INN and INP of differential amplifier 62 are connected to the common mode voltage $V_{cm}$. Capacitors CINT1 and CINT2 are discharged and the amplifier outputs OUTP and OUTN are both set to the common mode voltage $V_{cm}$. Switch A1 is controlled by clock signal φ, which is of the same frequency and phase as current pulse signal $I_{LED}$ driving light emitter 16 on and off. Switch B1 is controlled by complementary clock signal $\bar{\phi}$, which has the same frequency as but opposite phase of current pulse signal $I_{LED}$. Non-overlapping intervals may be provided between clock signal φ and clock signal $\bar{\phi}$ to accommodate charge injection from switching transients.

An integration cycle starts when RESET goes low at the middle of the high phase of current pulse signal $I_{LED}$. At this point, clock signal ϕ is high and clock signal $\bar{\phi}$ is low. Light emitter 16 is on, and switches A1 and B2 are on. Light emitter 16 causes light to be incident on the light detector 12 (providing object to be detected 20 is in close enough proximity to sensor 10 to generate reflected light signals 19) and thereby causes AC signal current ($I_{AC}$) to flow across light detector 12.

In addition, ambient light also generates a DC current that flows across photodiode or light detector 12 ($I_{DC}$). As switch B2 is also on, non-inverting input INP is held at the potential $V_{cm}$. Inverting input INN is held at the same potential $V_{cm}$ due to the virtual ground effect at the inputs of differential amplifier 62. As a result, current charges up capacitor CINT1 and causes output OUTP to go high. Common mode feedback (CMFB) circuit 64 then attempts to correct the average potential of OUTP and OUTN to $V_{cm}$. Thus, as OUTP goes high, CMFB circuit 64 causes OUTN to go low at the same rate for the same duration of time. This process continues for half the duration of the time period during which clock signal ϕ is high.

Next, light emitter or LED 16 turns off when $I_{LED}$ goes low. Switches B1 and A2 then turn on as clock signal ϕ goes low. During the time that light emitter or LED 16 is off, only ambient light shines on light detector 12 and thus only DC current flows across light detector or photodiode 12. Because switch A2 is closed, input INN is held at the voltage $V_{cm}$. Due to the virtual ground potential at the inputs of differential amplifier 62, input INP is also held at the voltage $V_{cm}$. As a result, DC current charges up capacitor CINT2 and causes output OUTN to go high. As output OUTN goes high, CMFB circuit 64 causes OUTP to go low at the same rate. This process continues for the full duration of time while clock signal ϕ is low until clock signal ϕ goes high again, at which point the process is repeated.

The end of a complete integration cycle may be set by the amount of time required for clock signal ϕ to become high for another half of a clock phase cycle. This is shown in FIG. 6, where one hundred complete integration cycles are indicated by N=1, N=2, . . . N=100 in the timing diagram. A measurement cycle may include one or more integration cycles. At the end of a measurement cycle, RESET goes high to discharge the capacitors, and outputs OUTP and OUTN are reset back to the common mode voltage $V_{cm}$ and made ready for the next measurement cycle.

Due to the fully differential embodiment of circuit 60 shown in FIG. 3, during each integration cycle DC current flows continuously, while AC current flows only during half the integration cycle. As a result, the average charge integrated by circuit 60 represents only the AC current signal. In other words, the average DC charge may be eliminated and cancelled during each integration cycle. Meanwhile, however, the average charge arising from AC signal contributions accumulates during successive integration cycles. Consequently, only a single measurement cycle is required to measure an integrated AC current signal, which has been stripped of the DC current contribution. As will now be seen, DC signal cancellation and AC signal integration may be achieved during each measurement cycle, which eliminates the need to provide additional steps or circuitry to remove unwanted DC current signal contributions. Moreover, no subsequent signal processing operations such as subtracting one DC signal from another DC signal are required, which leads to increased simplicity of, higher rates of signal acquisition by, and increased power efficiency in, circuit 60 and ADC 180.

Since differential outputs OUTP and OUTN are fed into the inputs of ADC 180, it is desirable to maximize the dynamic range of the signals being provided to ADC 180 so that the signal-to-noise ratios of the AC current signals are maximized. Because the average DC charge integrated over each measurement cycle is zero, the DC charge contributions at the INN and INP outputs contribute only a fixed portion of the full scale input signal range of ADC 180. As the number of integration cycles increases, however, the signal charge due to the AC current accumulates over time. The total integration time or number of integration cycles required for a measurement cycle is preferably a function of the maximum input signal range that is permitted at the succeeding ADC stage.

Over multiple integration cycles the AC current signal contribution may exceed the DC current signal contribution, which increases the effective dynamic range available in ADC 180 to measure integrated AC current signals. Considering that the AC current signal contribution over each measurement cycle can range between about 0.1 nA and about 5 nA, and that the DC current signal contribution can be about 2,000 nA or more, circuit 60 maximizes the AC signal contribution with respect to the DC signal contribution. As a result, no subtraction of two very nearly equal large numbers corresponding to DC current signals need be employed in the measurement method according to which circuit 60 operates This approach relaxes significantly the resolution requirements of ADC 180 and further enhances measurement accuracy and improves signal-to-noise ratios of the AC current signals. According to one embodiment, ADC 180 is a sigma-delta modulator that converts the integrated AC current signals into digital codes to represent the distance of object to be detected 20 from sensor 10. Circuit 60 may be designed and manufactured using standard digital CMOS process technologies, leading to increased circuit simplicity and cost-effectiveness.

According to one embodiment, differential amplifier 62 of circuit 60 is a carefully designed, ultra-low-noise, fully-differential amplifier that permits AC current signals in the sub-nano Ampere range to be detected. According to some embodiments, differential amplifier 62 is also chopper-stabilized to eliminate offset errors at its outputs. The measurement method according to which the operation of circuit 60 is controlled may include an initial auto-zero or calibration cycle during which light emitter 16 is completely turned off. When light emitter or LED 16 is subsequently switched on according to a given frequency and subsequent measurements are taken, the auto zero value can then be used to adjust measurement values that have already been taken, or that will be taken, for improved accuracy in distance measurement.

Included within the scope of the present invention are methods of making and having made the various components, devices and systems described herein.

Those skilled in the art will understand that the various embodiments of circuit 60 and optical proximity sensor 10 disclosed herein may be incorporated into portable electronic devices such as mobile telephones, smart phones, personal data assistants (PDAs), laptop computers, notebook computer, computers and other devices, as well as into stationary devices. Moreover, applications in which circuit 60 may be employed are not limited to optical proximity sensors and instead may include any suitable application in which small amplitude AC current signals arising from a pulsed light source must be measured accurately in the presence of undesired large amplitude DC light signals.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. An optical proximity sensor, comprising:
an infrared light emitter configured to emit AC pulses of infrared light, the infrared light emitter further being configured to emit no or low levels of infrared light in-between AC pulses;
a light detector configured to detect ambient light DC signals and infrared light AC pulses emitted by the light emitter and reflected from an object to be detected towards the light detector, and
a differential integrator circuit operably connected to the light detector and configured to receive output signals therefrom representative of the ambient light DC signals and the reflected infrared light AC pulses;
wherein the differential integrator circuit comprises a differential amplifier configured to receive first input signals from the light detector representative of the ambient light DC signals during first periods of time occurring in-between the pulses at a first input of the differential amplifier and second input signals representative of a combination of the ambient light DC signals and the reflected infrared light AC pulses during second periods of time occurring during the pulses at a second input of the differential amplifier, the differential integrator circuit further comprising a common mode feedback circuit connected to first and second outputs of the differential amplifier, the differential amplifier and differential integrator circuit being configured to provide first and second analog output signals representative of positive and negative integrated reflected infrared light AC pulses, respectively, the first and second analog output signals having the ambient light DC signals cancelled therefrom, wherein the differential integrator circuit comprises a first capacitor on a first current path from the first input of the differential amplifier to a first output of the differential amplifier that provides the first analog output signals and a second capacitor on a second current path from the second input of the differential amplifier to a second output of the differential amplifier that provides the second analog output signals and wherein the differential integrator circuit comprises first and second reset switches connected to the first capacitor and third and fourth reset switches connected to the second capacitor, the first and third reset switches being connected to discharge the first and second capacitors at an end of a measurement cycle, the second reset switch being connected to set the first input of the differential amplifier to a common mode voltage during the second periods, the fourth reset switch being connected to set the second input of the differential amplifier to the common mode voltage during the first periods.

2. The optical proximity sensor of claim 1, wherein the light emitter emits the pulses at a first frequency and the differential integrator circuit comprises first and second switches operably connected to the output of the light detector and the first and second inputs of the differential amplifier, respectively, the first and second switches being configured to open and close at the first frequency.

3. The optical proximity sensor of claim 2, wherein the first and second switches are driven by complementary opposite phase clock signals of the first frequency.

4. The optical proximity sensor of claim 2, wherein the first frequency ranges between about 10 kHz and about 5 MHz.

5. The optical proximity sensor of claim 2, wherein the first switch is configured to close during at least portions of time that the second switch is open, and the second switch is configured to close during at least portions of time that the first switch is open.

6. The optical proximity sensor of claim 2, wherein the first switch is configured to open during the first period of time and the second switch is configured to open during the second period of time, such that the first input signals representative of the ambient light signals only are passed through the first switch to the first input when the first switch is closed and the second input signals representative of the combination of the ambient light signals and the reflected AC infrared light signals pass through the second switch to the second input when the second switch is closed.

7. The optical proximity sensor of claim 1, wherein the infrared light emitter is operably connected to and operates under control of a processor or controller.

8. The optical proximity sensor of claim 1, wherein the differential integrator circuit is operably connected to and operates under control of a processor or controller.

9. The optical proximity sensor of claim 1, wherein the differential amplifier is a fully differential amplifier.

10. The optical proximity sensor of claim 9, wherein the fully differential amplifier is a low-noise amplifier.

11. The optical proximity sensor of claim 1, wherein the fully differential amplifier is chopper-stabilized.

12. The optical proximity sensor of claim 1, wherein the differential integrator circuit is operably connected to an analog-to-digital converter (ADC) and provides analog output signals to the ADC that are representative of the integrated AC infrared light signals.

13. The optical proximity sensor of claim 12, wherein the ADC is a sigma-delta ADC.

14. The optical proximity sensor of claim 12, further comprising a digital filter circuit configured to process output signals generated by the ADC.

15. The optical proximity sensor of claim 1, wherein the differential integrator circuit is configured to cancel the DC signals associated with the ambient light signals and to integrate the reflected AC infrared light signals over a single measurement cycle.

16. The optical proximity sensor of claim 1, further comprising a portable electronic device into which the optical proximity sensor is incorporated.

17. The optical proximity sensor of claim 16, wherein the portable electronic device is one of a mobile telephone, a smart phone, a personal data assistant (PDA), a laptop computer, a notebook computer, and a computer.

18. A method of operating an optical proximity sensor, comprising:
emitting AC pulses of infrared light from an infrared light emitter, the infrared light emitter being configured to emit no or low levels of infrared light in-between AC pulses;
detecting, with a light detector, ambient light DC signals and infrared light AC pulses emitted by the light emitter and reflected from an object to be detected towards the light detector;
receiving with a differential integrator circuit operably connected to the light detector output signals from the light detector representative of the ambient light DC signals and the reflected infrared light AC pulses;
receiving with a differential amplifier included in the differential integrator circuit first input signals from the light detector representative of the ambient light DC signals during first periods of time occurring, in-between the pulses at a first input of the differential amplifier and second input signals representative of a combination of the ambient light DC signals and the reflected infrared light AC pulses during second periods of time occurring during the pulses at a second input of the differential amplifier, and outputting from the differential amplifier and differential integrator circuit first and second analog output signals representative of positive and negative integrated reflected infrared light AC pulses, respectively, the first and second analog output signals having the ambient light DC signals cancelled therefrom, wherein the first and second analog output signals are input to a common mode feedback circuit connected to the differential amplifier, and wherein the method further comprises selectively closing first and second reset switches connected to a first capacitor of the differential integrator circuit on a first current path from the first input of the differential amplifier to a first output of the differential amplifier that provides the first analog output signals and selectively closing third and fourth reset switches connected to a second capacitor of the differential integrator circuit on a second current path from the second input of the differential amplifier to a second output of the differential amplifier that provides the second analog output signals, the closing of the first and third reset switches resulting in discharge of the first and second capacitors at an end of a measurement cycle, the closing of the second reset switch resulting in setting the first output of the differential amplifier to a common mode voltage during reset and the second periods, the closing of the fourth reset switch resulting in setting the second output of the differential amplifier to the common mode voltage during reset and the first periods.

19. The method of claim 18, further comprising providing the first and second analog output signals to an analog-to-digital converter (ADC).

20. The method of claim 19, wherein the ADC is a sigma-delta ADC.

* * * * *